United States Patent
Noguchi et al.

(10) Patent No.: US 8,304,125 B2
(45) Date of Patent: Nov. 6, 2012

(54) POWER SYSTEM INCLUDING POWER SUPPLY CONTROLLING UNIT WITH TEMPERATURE CONTROL

(75) Inventors: Minoru Noguchi, Wako (JP); Takeshi Fujino, Wako (JP); Eisuke Komazawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 322 days.

(21) Appl. No.: 12/755,013

(22) Filed: Apr. 6, 2010

(65) Prior Publication Data
US 2010/0273080 A1 Oct. 28, 2010

(30) Foreign Application Priority Data
Apr. 28, 2009 (JP) ................................. 2009-109136

(51) Int. Cl.
*H01M 8/04* (2006.01)
(52) U.S. Cl. ......... 429/430; 429/428; 429/432; 323/234
(58) Field of Classification Search ................. 429/428, 429/430, 432; 323/234
See application file for complete search history.

(56) References Cited

U.S. PATENT DOCUMENTS

| | | | |
|---|---|---|---|
| 2003/0217559 A1* | 11/2003 | Ieda et al. ................... | 62/230 |
| 2004/0005489 A1* | 1/2004 | Wakabayashi et al. ......... | 429/24 |
| 2006/0040149 A1* | 2/2006 | Aso et al. ..................... | 429/13 |
| 2009/0088915 A1* | 4/2009 | Kizaki ........................ | 701/22 |

FOREIGN PATENT DOCUMENTS

| | | |
|---|---|---|
| JP | 2006-020455 | 1/2006 |
| JP | 2006-288129 | 10/2006 |

\* cited by examiner

*Primary Examiner* — Barbara Gilliam
*Assistant Examiner* — Zachary Best
(74) *Attorney, Agent, or Firm* — Squire Sanders (US) LLP

(57) ABSTRACT

Provided is a power system capable of supplying power steadily to the outside even at a low temperature. A power supply unit disposed in the power system is configured to calculate an amount of power needed to heat a fuel cell to a temperature threshold when the temperature thereof measured by an FC sensor is below the temperature threshold, set an SOC lower limit by adding the calculated amount of power to a discharge threshold of a secondary battery, and control the power supply to a first power supply portion in the range of the SOC lower limit.

6 Claims, 8 Drawing Sheets

POWER SYSTEM INCLUDING POWER SUPPLY CONTROLLING UNIT WITH TEMPERATURE CONTROL

BACKGROUND OF THE INVENTION

1. Field of the Invention

The present invention relates to a power system disposed in a vehicle.

2. Description of the Related Art

Hitherto, there has been known a power system disposed in a vehicle (for example, refer to Japanese Patent Laid-open No. 2006-288129). In the power system, a battery is used as a power source, a voltage of the battery is boosted and supplied to a power line and the voltage supplied to the power line is converted into a commercial alternating voltage by a DC/AC converter for outputting. There has also been known a power system (for example, refer to Japanese Patent Laid-open No. 2006-20455) which converts power generated by a motor driven by an engine or power of a battery into a commercial alternating power via an AC inverter.

However, according to the power system only with the battery as the power source, although it is easy to provide the commercial alternating power converted from a direct voltage supplied from the battery after being boosted, it is impossible for the power system to surpass a capacity of discharge of the battery.

In the case where the power generated from the rotation of the motor driven by the engine is provided, if the engine is not ignited on, the power cannot be generated therefrom for use; and consequently, it is impossible for the power system to surpass the capacity of discharge of the battery.

Moreover, since it is necessary for the battery to supply power for igniting the engine or the like, it is impossible to convert the entire capacity of discharge of the battery into the commercial alternating power. Particularly, the power will be consumed by air conditioner or the like at a low temperature, there is the danger that the battery might supply power to the outside by surpassing a discharge threshold thereof, or the power supply to the outside from the battery according to the discharge threshold might be shut off suddenly.

SUMMARY OF THE INVENTION

The present invention has been accomplished in view of the aforementioned problems, and it is therefore an object of the present invention to provide a power system capable of supplying power steadily to the outside even at a low temperature.

A first aspect of the present invention provides a power system disposed in a vehicle. The power system of the present invention comprises: a power supply unit; a first voltage boost unit configured to have one side connected to the power supply unit and the other side connected to an electric motor for driving the vehicle, and to boost an output voltage from the power supply unit and supply power with the boosted output voltage to the electric motor; a second voltage boost unit configured to have one side connected to the other side of the first voltage boost unit in parallel with the electric motor, and to further boost the output voltage boosted by the first voltage boost unit; an electric accumulator connected to the other side of the second voltage boost unit; a first power supply portion which is connected to one side of the first voltage boost unit in parallel with the power supply unit and capable of supplying power to the outside; a first temperature sensor configured to measure a temperature of the power supply unit; and a power supply controlling unit configured to calculate an amount of power needed to heat the power supply unit equal to or greater than a temperature threshold when the temperature of the power supply unit measured by the first temperature sensor drops lower than the temperature threshold, set a first discharge threshold by adding the calculated amount of power to a discharge threshold of the electric accumulator, and control the power supply from the power supply unit and the electric accumulator to the first power supply portion to be greater than the first discharge threshold.

According to the power system of the first aspect of the present invention, in the power system which supplies power of a high voltage to the electric motor by boosting the voltage supplied from the power supply unit with the first voltage boost unit, the first power supply portion connected in parallel to the power supply unit can be supplied with power not only from the power supply unit but also from the electric accumulator via the second voltage boost unit.

Herein, the power needed to drive an accessory device or the like of the power supply unit is supplied from the electric accumulator, particularly at a low temperature, the power from the electric accumulator will be consumed by an air conditioner or the like of the power supply unit, the capacity of charge of the electric accumulator will be decreased. However, by calculating the amount of power needed to heat the power supply unit, setting the first discharge threshold by adding the calculated amount of power to the discharge threshold of the electric accumulator, and controlling the power supply from the electric accumulator to the first power supply portion to be greater than the first discharge threshold, it can be avoided that the electric accumulator might supply power to the outside by surpassing a discharge threshold thereof, or the power supply to the outside from the electric accumulator according to the discharge threshold might be shut off suddenly. Thereby, according to the power system of the present invention, the power can be supplied steadily to the outside even at a low temperature.

The power system of a second aspect of the present invention, which is dependent on the first aspect of the present invention, is provided with a fuel cell as the power supply unit; and a second temperature sensor configured to measure a temperature of a coolant circulated in a circulation path disposed in the vehicle for cooling at least the fuel cell; wherein the power supply controlling unit configured to calculate an amount of power needed to heat the coolant equal to or greater than a temperature threshold when the temperature of the coolant measured by the second temperature sensor drops lower than the temperature threshold, set a second discharge threshold by adding the calculated amount of power to the first discharge threshold, and control the power supply from the fuel cell and the electric accumulator to the first power supply portion to be greater than the second discharge threshold.

According to the power system of the second aspect of the present invention, in addition to the fuel cell itself, the coolant for cooling the fuel cell is also needed to be heated at a low temperature. Therefore, if the measured temperature of the coolant is below the temperature threshold where the heating is needed, by calculating the amount of power needed to heat the coolant, setting the new second discharge threshold by adding the calculated amount of power to the discharge threshold of the electric accumulator, and controlling the power supply from the electric accumulator to the first power supply portion to be greater than the second discharge threshold, the power can be supplied steadily to the outside even at a low temperature.

The power system of a third aspect of the present invention is dependent on the first or the second aspect of the present invention, wherein the power supply controlling unit is configured to control the power supply from the electric accumulator to the first power supply portion before the fuel cell is initiated.

According to the power system of the third aspect of the present invention, since the power of the electric accumulator is supplied to the first power supply portion by priority, the fuel cell can be minimally actuated. Thereby, it is not necessary to vary the output of the fuel cell in accordance with the power consumed by the first power supply portion; the power can be supplied to the first power supply portion steadily.

After a fuel cell is actuated, a given time interval is need for it to have a rated output of a predefined value. According to the power system of the present invention, the power is supplied to the first power supply portion from the electric accumulator before the actuation of the fuel cell; therefore, the first power supply portion can be available for use without waiting for the fuel cell to have the rated output.

The power system of a fourth aspect of the present invention is dependent on the third aspect of the present invention. The power system of the fourth aspect is provided with a capacitor connected to one side of the first voltage boost unit in parallel with the fuel cell; and a secondary battery as the electric accumulator; wherein the power supply controlling unit is configured to control the power supply firstly from the capacitor, secondly from the secondary battery and thirdly from the fuel cell, initiate the power supply to the first power supply portion from the secondary battery to the first power supply portion in place of the capacitor when a capacity of charge of the capacitor is equal to a discharge threshold, actuate the fuel cell when a capacity of charge of the secondary battery is equal to a predefined value greater than the second discharge threshold, and initiate the power supply from the fuel cell to the first power supply portion in place of the secondary battery when a predefined output is available from the fuel cell.

According to the power system of the fourth aspect of the present invention, since the capacitor has a capacity of charge smaller than the secondary battery but a higher charge/discharge rate, the capacitor is discharged at first; thereafter, the discharge from the second battery can be initiated before the capacity of charge of the capacitor drops below the discharge threshold.

Since the second battery with a greater capacity of charge is discharged thereafter, the decreasing rate of the capacity of charge due to the discharge is smaller, which makes it possible to supply power to the first power supply portion steadily over a long period. By setting a new second discharge threshold in consideration of the power consumed for heating so that the predefined output is available before the capacity of charge drops below the new second discharge threshold, it is possible for the fuel cell to supply power to the first power supply portion steadily even during the actuation interval at a low temperature, and the capacity of charge of the second battery can be prevented from dropping below the new discharge threshold.

Thirdly, by discharging the fuel cell after the predefined output thereof has become available, it is possible for the fuel cell to supply power to the first power supply portion and to charge the capacitor and the secondary battery meanwhile.

The power system of a fifth aspect of the present invention is dependent on the fourth aspect of the present invention. The power system of the fifth aspect is provided with a second power supply portion which is connected in parallel to the second voltage boost unit and the secondary battery and capable of supplying power to the outside.

According to the power system of the fifth aspect of the present invention, the second power supply portion is connected to the secondary battery between the second voltage boost unit and the second battery, and is supplied with power from the secondary battery by priority in a range of the new discharge threshold. Accordingly, even in a low temperature, it is possible to steadily supply a relatively small power to the second power supply portion from the secondary battery over a long period.

The power system of a sixth aspect of the present invention is dependent on the fourth or the fifth aspect of the present invention. The power system of the sixth aspect is provided with a display unit configured to display an amount of power which can be supplied from the capacity of charge of the capacitor and the secondary battery.

According to the power system of the sixth aspect of the present invention, a user of the power system can recognize visually the amount of power available from the first or the second power supply portion steadily according to the charge mount of the capacitor and the secondary battery. Particularly, when the second power supply portion is disposed in addition to the first power supply portion, the user can select from either of the first and the second power supply portions to obtain the power supply.

DETAILED DESCRIPTION OF THE PREFERRED EMBODIMENTS

Figure 1:
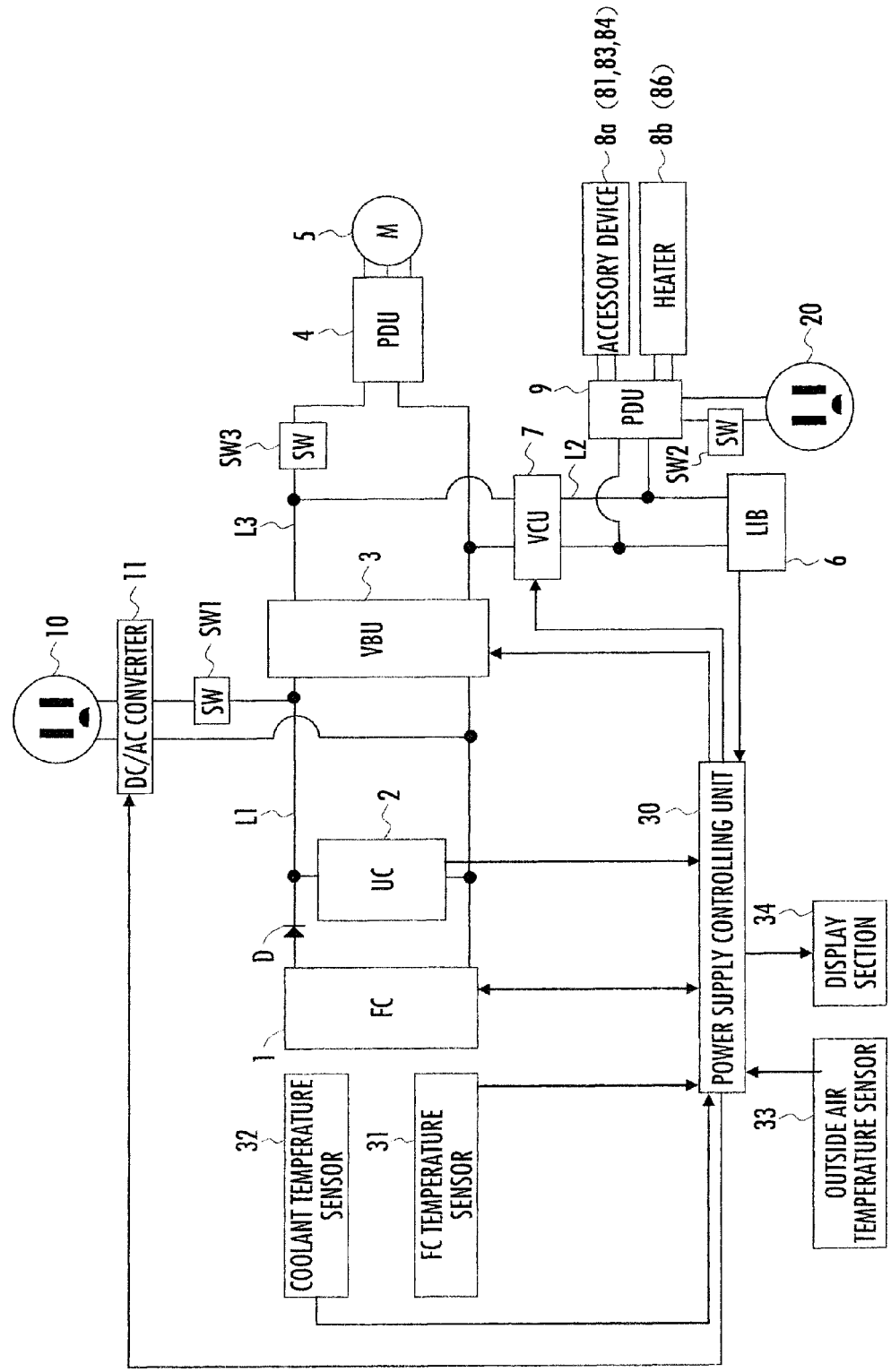
FIG. 1 is a diagram illustrating the entire configuration of a power system according to an embodiment of the present invention.

As illustrated in FIG. 1, a power system of the present embodiment is disposed in a fuel cell vehicle (corresponds to a vehicle of the present invention). The power system is provided with a fuel cell 1 (corresponds to a power supply unit of the present invention), a double-layer electric capacitor 2 (hereinafter, simply referred to as the capacitor 2) connected in parallel to the fuel cell 1, a voltage boost unit 3 (corresponds to a first voltage boost unit of the present invention), a secondary battery 6 (a lithium-ion battery in the present embodiment), and a voltage converter 7 (corresponds to a second voltage boost unit of the present invention). An input section of the voltage boost unit 3 is connected to both the fuel cell 1 and the capacitor 2, and an output section thereof is connected to an electric motor 5 via a PDU 4 (Power Drive Unit). An input section of the voltage converter 7 is connected to the voltage boost unit 3 and an output section thereof is connected to the secondary battery 6.

The fuel cell 1 is constituted by connecting, for example, 250 fuel cell stacks in series and has an output voltage varying in a range of about 225V (output current 0 A) to 180V (output current 230 A). The capacitor 2, which is a double-layer electric capacitor, has an output voltage varying around 200V (in a range of a lower limit of about 150V to an upper limit of about 250V). An output voltage of the secondary battery 6 varies in a range of about 300V to 500V.

The voltage boost unit 3 is, for example, a DC/DC converter having a boost ratio of 1.2 to 3.0 at a rated output of 70 kW. The voltage boost unit 3 has at least a voltage boost function and a voltage step-down function may be added thereto where appropriate. The voltage converter 7 is, for example, a DC/DC converter having a boost ratio of 1.2 to 3.0 at a rated output of 30 kW. At least one of the voltage boost unit 3 and the voltage converter 7 performs a current feedback control to limit a value of the boosted current not greater than a predefined value.

The power system is further provided with a first power supply portion 10 (an output outlet in the present embodiment) between capacitor 2 and the voltage boost unit 3. The first power supply portion 10 is connected to the fuel cell 1 and the capacitor 2 in parallel. The first power supply portion 10 is connected via a DC/AC converter 11 composed of an inverter circuit to a first power supply line L1 joining directly to the fuel cell 1 and the capacitor 2. The DC/AC converter 11 converts a direct voltage of the first power supply line L1 into a commercial alternating voltage and supplies it to the first power supply portion 10.

The power system is also provided with an accessory device 8*a*, a heater 8*b* and a second power supply portion 20 (an outlet in the present embodiment) between secondary battery 6 and the voltage converter 7. The accessory device 8*a*, the heater 8*b* and the second power supply portion 20 are connected to the secondary battery 6 and the voltage converter 7 in parallel.

Figure 2:
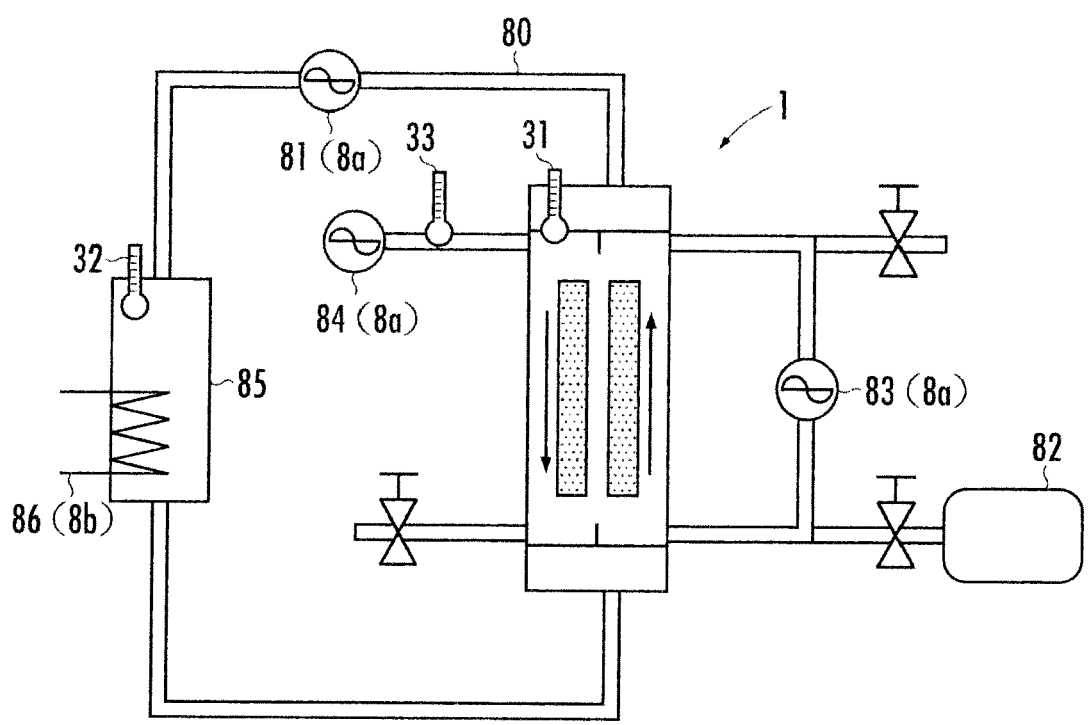
FIG. 2 is an explanatory diagram illustrating a configuration of a fuel cell illustrated in FIG. 1.

As illustrated in FIG. 2, the accessory device 8*a* is equivalent to a coolant circulation pump 81 for circulating a coolant (cooling water) circulated in a circulation path 80 disposed in the vehicle and used to cool at least the fuel cell 1, a hydrogen circulation pump 83 for supplying reactant gases such as hydrogen gas from a fuel tank 82 to the fuel cell 1, and a fan 84 for drawing air from the outside to the fuel cell 1. The heater 8*b* is equivalent to an electric heater 86 attached to a radiator 85 disposed in the circulation path 80 for heating the coolant (cooling water).

The accessory device 8*a*, the heater 8*b* and the second power supply portion 20 are connected via a PDU 9 (Power Drive Unit) to a second power supply line L2 joining directly to the secondary battery 6 and the voltage converter 7. The second power supply portion 20 is supplied with a low voltage (for example, DV 12V) adjusted by the PDU 9 from the secondary battery 6 by priority, and may be connected by, for example, a television, a radio, a lightening device or the like carried into the vehicle.

A first switch SW1 is disposed between the first power supply line L1 and the DC/AC converter 11 for turning on or off the power supply to the first power supply portion 10. A second switch SW2 is disposed between the second power supply portion 20 and the PDU 9 for turning on or off the power supply from the second power supply line L2 to the second power supply portion 20. A third switch SW3 is disposed in a third power supply line L3 for turning on or off the power supply from the third power supply line L3 where the power from the first power supply line L1 is boosted by the voltage boost unit 3 to the electric motor 5. The ON/OFF of the third switch SW3 is controlled by a power supply controlling unit 30 (to be described hereinafter) in conjunction with the ON/OFF of the first switch SW1 and the second switch SW2 operated by a user.

The power supply controlling unit 30 provided in the power system is configured to acquire detection signals from a voltage sensor and a current sensor (not shown) disposed for each of the fuel cell 1, the capacitor 2 and the secondary battery 6, and to detect an output voltage, an output current and an output power from each of the fuel cell 1, the capacitor 2 and the secondary battery 6.

The power supply controlling unit 30 is provided with a table defining a relationship between an output voltage and output current from the capacitor 2 and an SOC (State of Charge) representing a capacity of charge of the capacitor 2 and a table defining a relationship between an output voltage and output current from the secondary battery 6 and an SOC representing a capacity of charge of the secondary battery 6. On the basis of the output voltage and the output current from each of the capacitor 2 and the secondary battery 6, the power supply controlling unit 30 estimates the SOC of each of the capacitor 2 and the secondary battery 6.

As to be described hereinafter, the power supply controlling unit 30, on the basis of the output power from the fuel cell 1 and each SOC of the capacitor 2 and the secondary battery 6, performs an operation control on the fuel cell 1 and an operation control on the voltage boost unit 3, the voltage converter 7 and the DC/AC converter 11, supplies power from the fuel cell 1, the capacitor 2 and the secondary battery 6 to the first power supply portion 10, and charges the capacitor 2 and the secondary battery 6 with the fuel cell 1.

When the vehicle is decelerated, the electric motor 5 functions as a generator, the power supply controlling unit 30 recovers regenerative electric power generated by the electric motor 5 when the vehicle is decelerated and charges the capacitor 2 and the secondary battery 6 by the regenerative electric power. Herein, the power supply controlling unit 30, on the basis of a voltage sensor and a current sensor (not shown) disposed in the PDU 4, detects the regenerative electric power by the electric motor 5, performs the operation control on the voltage boost unit 3 and the voltage converter 7, and charges the capacitor 2 and the secondary battery 6 by the use of the electric motor 5.

As illustrated in FIG. 2, the power supply controlling unit 30 is connected to an FC temperature sensor 31 (corresponds to a first temperature sensor of the present invention) attached to the fuel cell 1 for measuring a temperature thereof, a coolant temperature sensor 32 (corresponds to a second temperature sensor of the present invention) disposed in the radiator 85 of the circulation path 80 for measuring a temperature of the coolant circulated in the circulation path 80, and an outer air temperature sensor 33 for measuring a temperature of outer air drawn from the outside of the vehicle. The power supply controlling unit 30 acquires the temperatures from the temperature sensors, respectively.

The power supply controlling unit 30 is further provided with a display section 34 composed of a liquid crystal displayer, for example. The output power from the fuel cell 1, the amount of power available from the SOC of the capacitor 2 and the secondary battery 6, whether or not the first power supply portion 10 is being supplied with power from either of the fuel cell 1, the capacitor 2 and the secondary battery 6, whether or not the capacitor 2 and the secondary battery 6 are being charged by the fuel cell 1 and the like are displayed on the display section 34.

The power supply controlling unit 30 acquires the above-mentioned data, performs calculations thereon and displays the data on the display section 34 in a predefined period or at a specified timing. The specified timing refers to, for example, ON/OFF timing of ignition, ON/OFF timing of the first switch SW1 or the second switch SW2. Therefore, the user can recognize the amount of power available from the first power supply portion 10 or the second power supply portion 20 according to the SOC of the capacitor 2 and the secondary battery 6, and decide to obtain the power supply from either one of the first power supply portion 10 and the second power supply portion 20.

For example, when both the SOC of the capacitor 2 and the SOC of the secondary battery 6 are equal to or greater than a predefined level (30% for example) or the SOC of the secondary battery 6 is equal to or greater than the predefined level, the user can recognize that it is appropriate to receive the power supply from the first power supply portion 10. On the other hand, when the SOC of the secondary battery 6 is below the predefined level, the user can recognize that it is relatively appropriate to receive the power supply from the second power supply portion 20 other than the first power supply portion 10. Thereby, the user can be provided with an index to determine which one of the first power supply portion 10 and the second power supply portion 20 should be selected to receive the power supply.

In the power system of the present embodiment, a diode D is disposed at a location between the fuel cell 1 and the voltage boost unit 3 and the capacitor 2 to prevent electrical current from flowing into the fuel cell 1. It is also acceptable to prevent the electrical current from flowing into the fuel cell 1 by using another rectifier such as a transistor in place of the diode D, or to connect the capacitor 2 with the fuel cell 1 via a voltage STEP-down unit (a down converter).

The above-mentioned is the overall configuration of the power system of the present embodiment.

Hereinafter, with reference to FIG. 3 to FIG. 9, the overall operation of the power system according to the present embodiment will be described.

Figure 3:
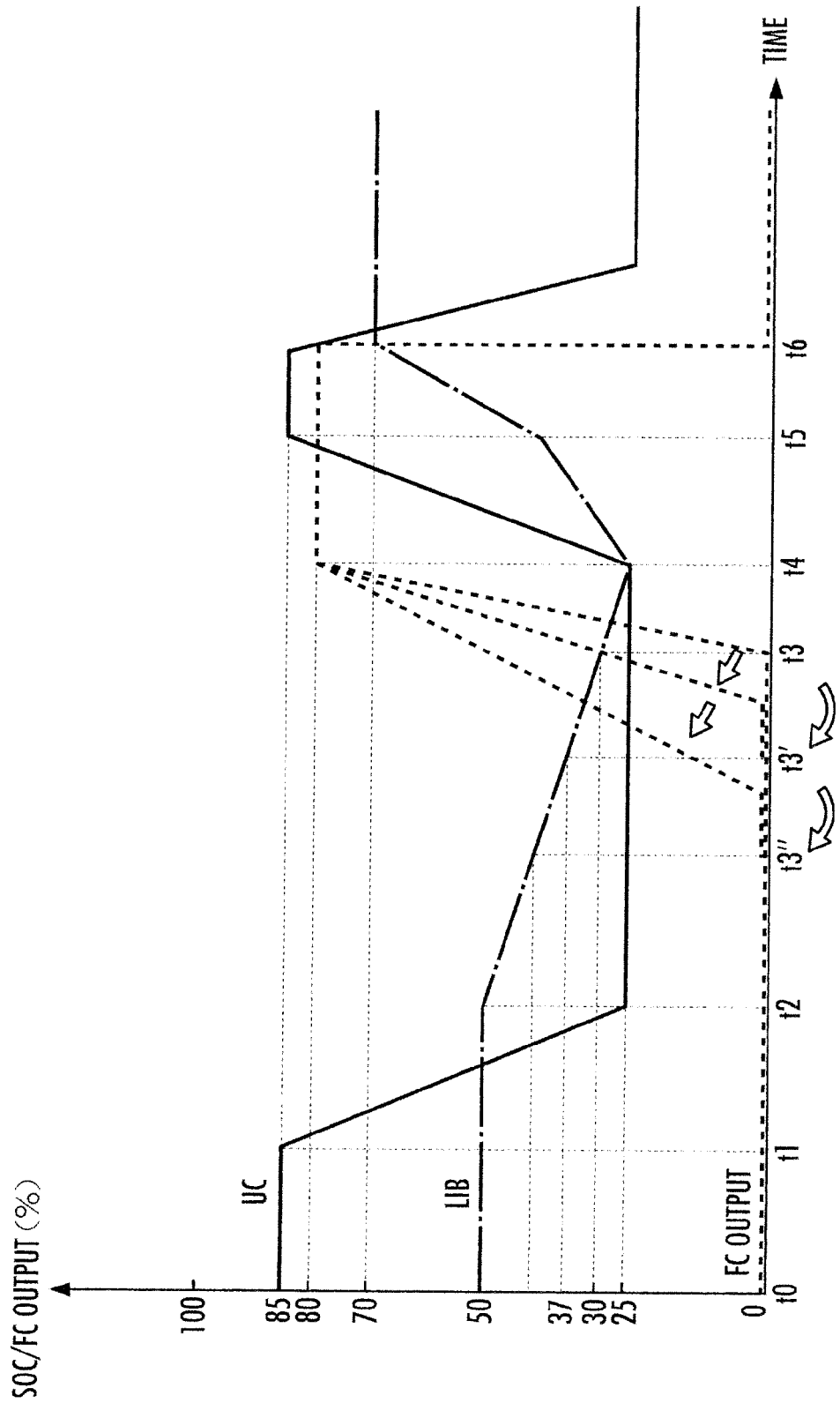
FIG. 3 is an explanatory diagram illustrating a power supply behavior of the power system illustrated in FIG. 1.

FIG. 3 illustrates a variation pattern on the power supply from the fuel cell 1, the capacitor 2 and the secondary battery 6 to the first power supply portion 10. The lateral axis is set to denote a time (t), and the vertical axis is set to denote a percentage (%) of the SOC of the capacitor 2 and the secondary battery 6 with respect to the output from the fuel cell 1.

In the present embodiment, description will be carried out on such a situation where the ignition of the fuel cell vehicle is set at OFF, the power generation from the fuel cell 1 is not performed at time t0 and the fuel cell 1 supplies power to the outside through the first power supply portion 10. For example, the fuel cell vehicle has entered a camping area or the like and the ignition is set at OFF; an external device (for example, a personal computer, a hot plate or the like) is connected to the first power supply portion 10 and receives the power supply therefrom.

Figure 4:
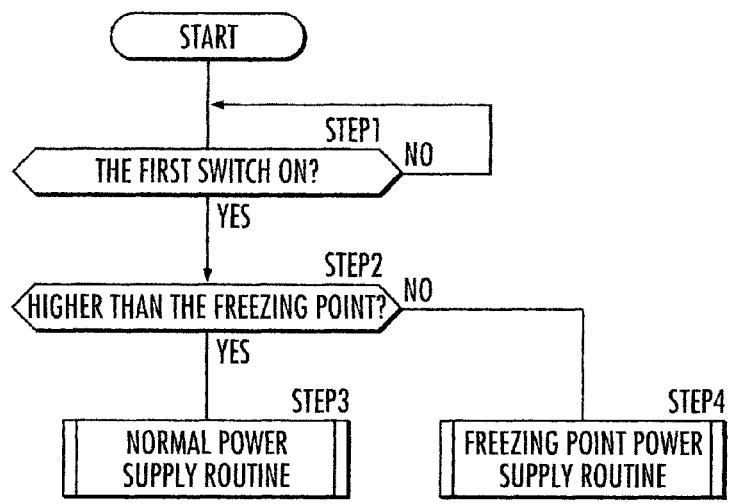
FIG. 4 is a flow chart illustrating a power supply process.

At time t1, when the user turns on the first switch SW1 and connects the external device to the first power supply portion 10, the power supply controlling unit 30 detects that the first switch SW1 has been turned on according to the flow chart illustrated in FIG. 4 (YES at STEP 1). On the other hand, if it is determined that the first switch SW1 has not been turned on (NO at STEP 1), the process returns and repeats the detection.

After the first switch SW1 had been detected to have been turned on, the power supply controlling unit 30 determines whether or not a part of or the entire part of measured temperatures from the FC temperature sensor 31, the coolant temperature sensor 32 and the outside air temperature sensor 33 is lower than the freezing point (STEP 2).

If it is determined that the measured temperature is not lower than the freezing point (YES at STEP 2), the power supply to the first power supply portion 10 is performed according to a normal power supply routine which will be described hereinafter (STEP 3). On the other hand, if the measured temperature is lower than the freezing point (NO at STEP 2), the power supply to the first power supply portion 10 is performed according to a freezing point power supply routine which will be described hereinafter (STEP 4).

If the first switch SW1 is turned on and the ignition is turned off, the power supply controlling unit 30 turns off the third switch SW3 to shut off the power supply to the PDU 4. Accordingly, when the ignition is off, the power will not be supplied to the PDU 4 and the electric motor 5 to prevent the power from being consumed unnecessarily.

Hereinafter, the normal power supply routine will be described with reference to FIG. 5 and FIG. 6.

Firstly, the power supply controlling unit 30 estimates the SOC of the capacitor 2 according to an SOC estimation routine for the capacitor 2 (STEP 10) and determines whether or not the SOC of the capacitor 2 is greater than 25% (corresponds to the discharge threshold of the present invention) (STEP 20). In the SOC estimation routine for the capacitor 2 at STEP 10, the SOC is calculated according to an output voltage and an output current from the capacitor 2 and a table defining a relationship between the output voltage, the output current and the SOC of the capacitor 2. It should be noted that the SOC of the capacitor 2 can be calculated according to the output voltage only even if the output current of the capacitor 2 is zero.

When the SOC of the capacitor 2 is greater than 25% (YES at STEP 20), the power supply from the capacitor 2 to the first power supply portion 10 is initiated (STEP 30) and the process returns to STEP 10.

To be specific, as illustrated in FIG. 3, when the SOC of the capacitor 2 is about 85% at time t1 (YES at STEP 20), the power supply controlling unit 30 stops the voltage boost unit 3 and the voltage converter 7 from working, and meanwhile actuates the DC/AC converter 11 to convert the direct voltage in the first power supply line L1 directly joined to the capacitor 2 into the commercial alternating voltage and supplies the commercial alternating voltage to the first power supply portion 10 (STEP 30). When the capacitor 2 begins to supply power to the first power supply portion 10, the SOC thereof decreases gradually with time (t1<t<t2).

Figure 5:
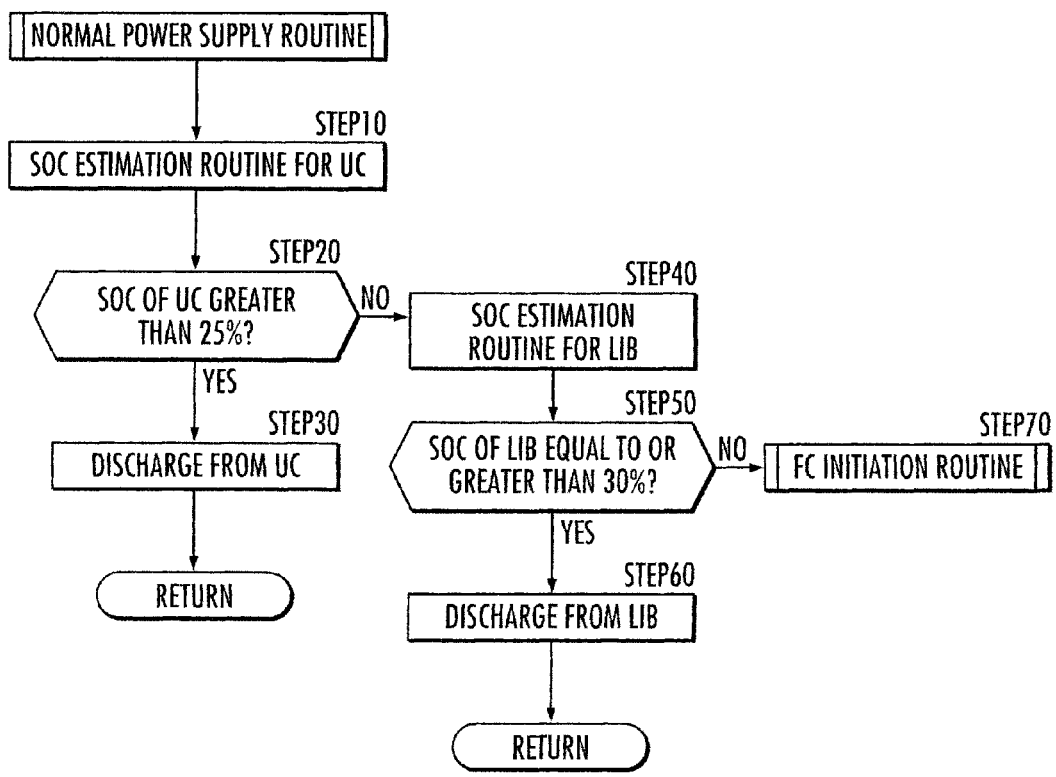
FIG. 5 is a flow chart illustrating a process of a normal power supply routine in FIG. 4.
Figure 6:
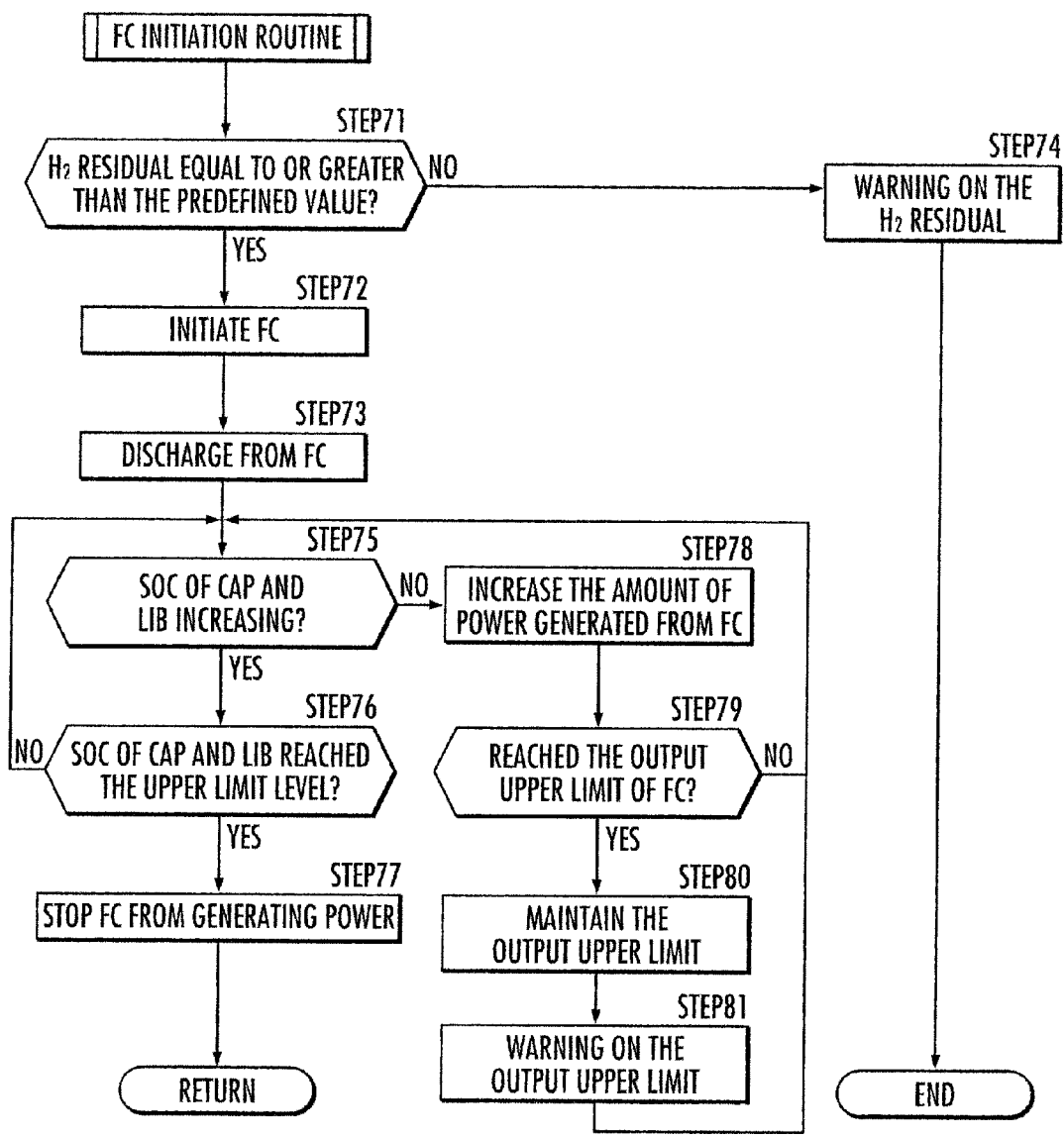
FIG. 6 is a flow chart illustrating a process of an FC initiation routine in FIG. 5.

Thereafter, with reference to FIG. 5, when the SOC of the capacitor 2 is equal to or lower than 25% (NO at STEP 20), the power supply controlling unit 30 estimates the SOC of the secondary battery 6 according to an SOC estimation routine for the secondary battery 6 (STEP 40), and determines whether or not the SOC of the secondary battery 6 is equal to or greater than 30% (STEP 50).

The reason to set the threshold for determining the SOC of the secondary battery 6 as 30% is to make the power supply from the fuel cell 1 available before the SOC of the secondary battery 6 is decreased to 25% (corresponds to the discharge threshold of the present invention) by taking into consideration a time lag from a time where the fuel cell 1 is actuated to a time where the fuel cell 1 can output the rated output of the predefined value. In the SOC estimation routine for the secondary battery 6 at STEP 40, the SOC of the secondary battery 6 is calculated according to an output voltage and an output current from the secondary battery 6 and a table defining a relationship between the output voltage, the output current and the SOC of the secondary battery 6. It should be noted that the SOC of the secondary battery 6 can be calculated according to the output voltage only even if the output current of the secondary battery 6 is zero.

When the SOC of the secondary battery 6 is equal to or greater than 30% (YES at STEP 50), the power supply from the secondary battery 6 to the first power supply portion 10 is initiated (STEP 60) and the process returns to STEP 10.

To be specific, as illustrated in FIG. 3, when the SOC of the capacitor 2 decreases with time to 25% at time t2 (t1<t<t2) (STEP 20), the power supply controlling unit 30 estimates the SOC of the secondary battery (STEP 40). According to FIG. 3, the SOC of the secondary battery 6 at time t2 is about 50% (YES at STEP 50), the power supply controlling unit 30 actuates the voltage boost unit 3 and the voltage converter 7 to supply the power from the secondary battery 6 to the first power supply portion 10 (STEP 60).

In other words, after the power of a direct voltage (about 290V to 350V) in the second power supply line L2 directly connected to the secondary battery 6 is boosted to the power of a voltage (370V to 570V) in the third power supply line L3 by the voltage converter 7, the power is supplied from the secondary battery 6 to the first power supply line L1 by using the voltage boost unit 3 as a down-converter from the side of the electric motor 5.

When the power is supplied to the first power supply portion 10 from the secondary battery 6, the SOC of the secondary battery 6 decreases gradually with time (t2<t<t3).

Hereinafter, with reference to FIG. 5, when the SOC of the secondary battery 6 is less than 30% (NO at STEP 50), the power supply controlling unit 30 performs the power generation from the fuel cell 1 and supplies the power from the fuel cell 1 to the first power supply portion 10 according to an FC initiation routine which will be described hereinafter (refer to FIG. 6).

To be specific, as illustrated in FIG. 3, when the SOC of the secondary battery 6 decreases with time (t2<t<t3) to be less than 30% at time t3 (STEP 50), the power supply controlling unit 30 initiates the power generation from the fuel cell 1. When the output from the fuel cell 1 reaches the rated output of the predefined value (for example, about 80% of the maximum output) at time t4, the power supply controlling unit 30 supplies the power to the first power supply portion 10 from the fuel cell 1, and meanwhile, actuates the voltage boost unit 3 and the voltage converter 7 to supply the power to charge the capacitor 2 and the secondary battery 6.

In other words, when the power is supplied from the fuel cell 1 to the first power supply line L1 at time t4, the power will be supplied to the first power supply portion 10 and meanwhile to the capacitor 2 for charging the capacitor 2. The power supplied to the first power supply line L1 is supplied to the secondary battery 6 via the voltage boost unit 3 and the voltage converter 7 to charge the second battery 6.

When the SOC of the capacitor 2 and the SOC of the secondary battery 6 increase (t4<t<t6) to predefined levels, respectively, at t6, the power generation from the fuel cell 1 is stopped and once again the power is supplied to the first power supply portion 10 from the capacitor 2, the secondary battery 6 and the fuel cell 1 sequentially (Return at STEP 10).

Hereinafter, with reference to the chart in FIG. 6, the FC initiation routine of STEP 70 will be described in detail.

Firstly, the power supply controlling unit 30 determines whether or not the hydrogen residual is equal to or greater than a given level according to the residual of the fuel tank 82 where the hydrogen is stored as a fuel of the fuel cell 1 (STEP 71). The given level may be, for example, the hydrogen amount available to drive the fuel cell 1 for a given time.

If the hydrogen residual is determined to be equal to or greater than the given level (YES at STEP 71), the power is supplied to the accessory device 8 via the PDU 9 to actuate the accessory device 8, and as a result thereof, the reactant gas supply to the fuel cell 1 is initiated and the fuel cell 1 is actuated (STEP 72). As mentioned above, when the output from the fuel cell 1 has reached the rated output of the predefined value, the power supply controlling unit 30 initiates the power supply from the fuel cell 1 to the first power supply line L1 (STEP 73). Accordingly, the power is supplied from the fuel cell 1 to the first power supply portion 10.

On the other hand, if the hydrogen residual is determined to be lower than the given level (NO at STEP 71), a warning message is displayed on the display section 34 informing that the hydrogen residual is insufficient (STEP 74), and the process is terminated.

Subsequently, when the power is supplied from the fuel cell 1 to the first power supply line L1 (STEP 73), the power supply controlling unit 30 determines whether or not the SOC of the capacitor 2 and the SOC of the secondary battery 6 are increasing according to the output voltage from the capacitor 2 and the secondary battery 6, respectively (STEP 75).

If both the SOC of the capacitor 2 and the SOC of the secondary battery 6 are increasing (YES at STEP 75), whether or not the SOC of the capacitor 2 and the SOC of the secondary battery 6 have reached an upper limit level, respectively, is determined (STEP 76). If the both the SOC of the capacitor 2 and the SOC of the secondary battery 6 have reached the upper limit level (YES at STEP 76), the power generation from the fuel cell 1 is stopped (STEP 77), the process related to the initiation routine for the fuel cell 1 at STEP 70 is terminated and the process returns to STEP 10 (refer to FIG. 5).

On the other hand, if either SOC of the capacitor 2 and the secondary battery 6 is not increasing (NO at STEP 75), the charging on the capacitor 2 and the secondary battery 6 by the fuel cell 1 is not performed and the power to the first power supply portion 10 may be supplied from either the capacitor 2 or the secondary battery 6. In this case, the amount of power generated from the fuel cell 1 is increased (STEP 78) to make the output voltage of the fuel cell 1 higher. Subsequently, whether or not the amount of power generated from the fuel cell 1 after being increased has reached the output upper limit is determined (STEP 79).

If the amount of power generated from the fuel cell 1 after increased does not reach the output upper limit (NO at STEP 79), the process returns to STEP 75 for determining whether or not the SOC of the capacitor 2 and the SOC of the secondary battery 6 are increasing according to the output voltage from the capacitor 2 and the secondary battery 6. On the other hand, if the amount of power generated from the fuel cell 1 after being increased is determined to have reached the output upper limit of the fuel cell 1 (YES at STEP 79), the amount of power generated from the fuel cell 1 is maintained at the output upper limit (STEP 80), and meanwhile, a message informing that the output from the fuel cell 1 has reached the output upper limit is displayed on the display section 34 (STEP 81), and the process returns to STEP 75 for whether or not the SOC of the capacitor 2 and the SOC of the secondary battery 6 are increasing according to the output voltage from the capacitor 2 and the secondary battery 6.

If the SOC of the capacitor 2 and the SOC of the secondary battery 6 are determined to have not reached the upper limit level at STEP 76 (NO at STEP 76), the process returns to STEP 75 for determining whether or not the SOC of the capacitor 2 and the SOC of the secondary battery 6 are increasing continuously according to the output voltage from the capacitor 2 and the secondary battery 6.

Hereto, the normal power supply routine of STEP 3 has been described in detail.

Hereinafter, a freezing point power supply routine will be described with reference to FIG. 7 and FIG. 8. The freezing point power supply routine only partially differs from the normal power supply routine; therefore, the freezing point power supply routine will be explained by using the same reference number (STEP number) to the normal power supply routine when they are of the same process.

Figure 7:
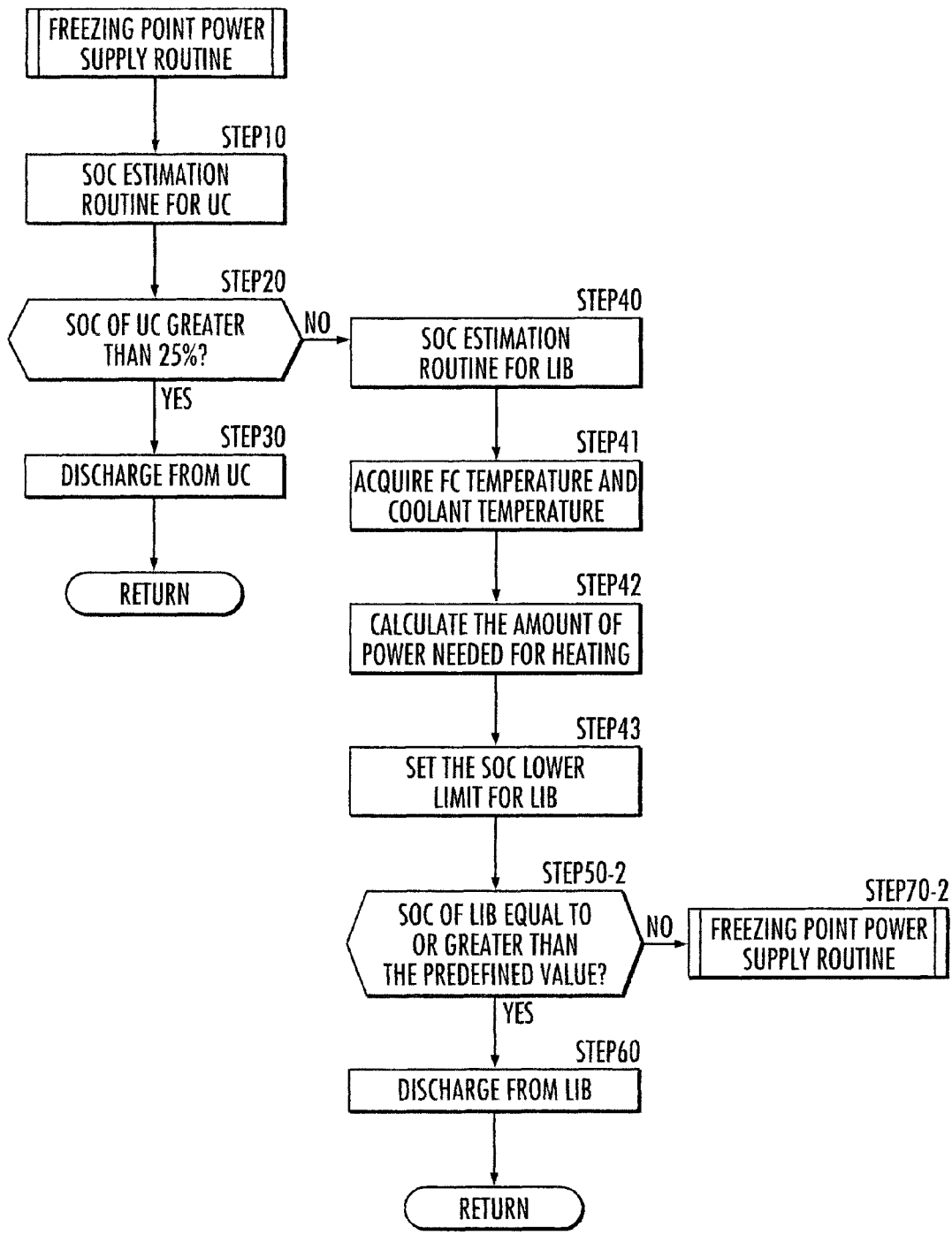
FIG. 7 is a flow chart illustrating a process of a freezing point power supply routine in FIG. 4.
Figure 8:
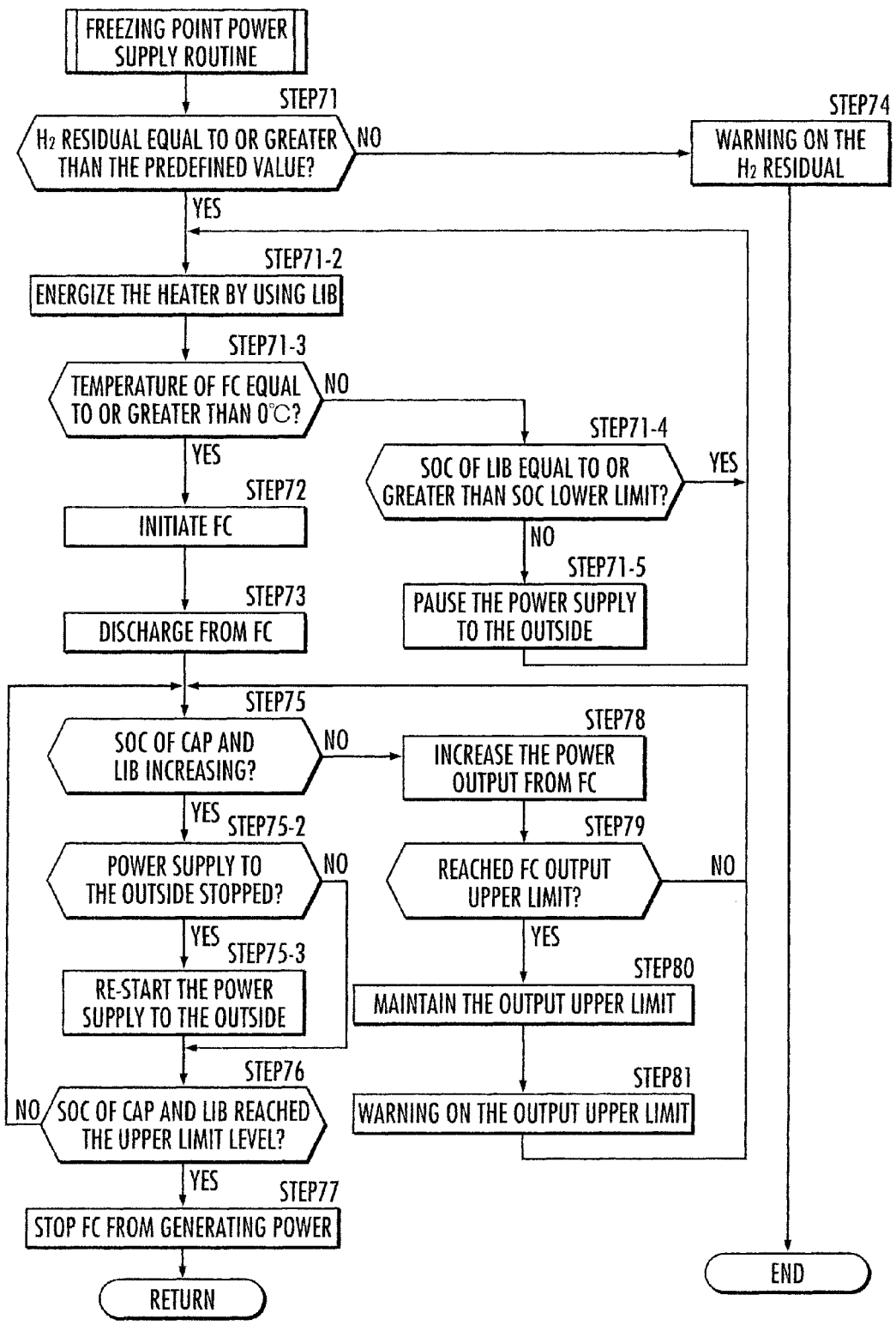
FIG. 8 is a flow chart illustrating a process of a freezing point initiation routine in FIG. 7.

As illustrated in FIG. 7, in the freezing point power supply routine, the power supply controlling unit 30 sets a SOC lower limit (the first or the second discharge threshold of the present invention) of the secondary battery 6 at a low temperature (freezing point) (STEP 41 to STEP 43), and performs the power supply from the secondary battery 6 to the first power supply portion 10 on the basis of whether or not the SOC of the secondary battery 6 is equal to or greater than a predefined value which is greater than the SOC lower limit (STEP 50-2).

To be specific, the power supply controlling unit 30 estimates the SOC of the secondary battery 6 at STEP 40, and subsequently, acquires the measured temperatures from the FC temperature sensor 31 and the coolant temperature sensor 32 (STEP 41).

Thereafter, the power supply controlling unit 30 calculates the amount of power needed to heat the fuel cell 1 and the coolant to 0° C. or higher according to the measured temperatures acquired from FC temperature sensor 31 and the coolant temperature sensor 32.

Figure 9:
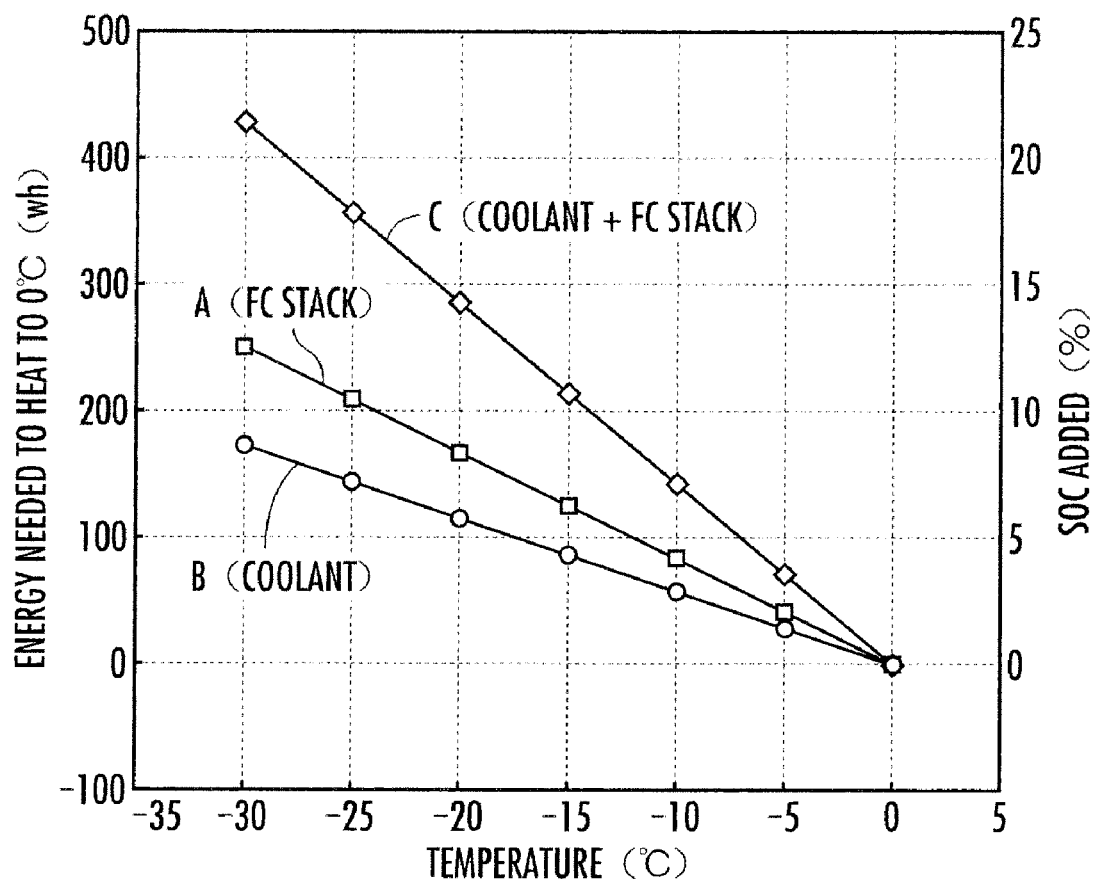
FIG. 9 is a chart illustrating a relationship among a temperature, an amount of power needed for heating and a total SOC.

To be more specific, as illustrated in FIG. 9, the amount of power is calculated according to a map or data table defining energy (WH, the left vertical axis) needed to heat the fuel cell 1 and the coolant to 0° C. with respect to a measured temperature (° C., horizontal axis).

For example, as illustrated in FIG. 9, when the measured temperature of the fuel cell 1 is −10° C., the energy needed to heat the fuel cell 1 to 0° C. is about 80 WH according to line A. Similarly, when the measured temperature of the coolant is −10° C., the energy needed to heat the fuel cell 1 to 0° C. is about 60 WH according to line B. Then, the power supply controlling unit 30 calculates a total value by adding up the energies (about 140 WH) and uses it as the amount of power needed for heating (STEP 42).

Thereafter, the power supply controlling unit 30 adds up the amount of power calculated at STEP 42 to the discharge threshold of the secondary battery 6 and sets it as a SOC lower limit of the second battery 6 (corresponds to the second discharge threshold of the present invention) (STEP 43).

To be specific, as illustrated in FIG. 9, the amount of power (WH, the left vertical axis) calculated at STEP 42 is read as the SOC (%, the right vertical axis), and the SOC is added into the discharge threshold of the secondary battery 6.

For example, when the measured temperature of the fuel cell 1 and the coolant is −10° C., the energy needed to heat the fuel cell 1 and the coolant to 0° C. is about 140 WH according to line C, which corresponds to 7% of the SOC of the secondary battery 6. The 7% of the SOC is added to the discharge threshold 25% of the secondary battery 6; thereby, the SOC lower limit is set to 32% (STEP 43).

The summed SOC lower limit at STEP 43 has been calculated in consideration of the heating time (time needed to heat the fuel cell 1 and the coolant to 0° C.) by the heater 86.

Subsequently, the power supply controlling unit 30 determines whether or not the SOC of the secondary battery 6 is equal to or greater than a predefined value (for example 37%) which is obtained by adding a given value (for example 5%) to the SOC lower limit set at STEP 43 (STEP 50-2). Similar to the normal power supply routine at STEP 50, by taking into consideration a time lag from a time where the fuel cell 1 is actuated to a time where the fuel cell 1 can output the rated output of the predefined value, the given value is added to the SOC lower limit of the secondary battery 6.

The power supply controlling unit 30 initiates the power supply to the first power supply portion 10 from the secondary battery 6 (STEP 60) when the SOC of the secondary battery 6 is equal to or greater than the predefined value (YES at STEP 50-2), and performs the power generation from the fuel cell 1 to supply the power to the first power supply portion 10 from the fuel cell 1 according to a freezing point FC initiation routine (refer to FIG. 8) which will be explained hereinafter when the SOC of the secondary battery 6 is less than the predefined value (NO at STEP 50-2).

Hereinafter, with reference to the flow chart in FIG. 8, the freezing point FC initiation routine at STEP 70-2 will be described in detail.

When the hydrogen residual in the fuel tank 82 is equal to or greater than a predefined level (YES at STEP 71), the power supply controlling unit 30 energizes the heater 86 by using the secondary battery 6 (STEP 71-2). Herein, the power supply controlling unit 30 acquires the measured temperature from the coolant temperature sensor 32, and actuates the coolant circulation pump 81 as soon as the temperature of the coolant is equal to or greater than 0° C.

Subsequently, the power supply controlling unit 30 acquires the measured temperature from the FC temperature sensor 31 and determines whether or not the temperature of the fuel cell 1 is equal to or greater than 0° C. (STEP 71-3).

When the temperature of the fuel cell 1 is equal to or greater than 0° C. (YES at STEP 71-3), the power supply controlling unit 30 actuates the fuel cell 1 (STEP 72).

On the other hand, when the temperature of the fuel cell 1 is lower than 0° C. (NO at STEP 71-3), whether or not the SOC of the secondary battery 6 is equal to or greater than the SOC lower limit set at STEP 43 is determined (STEP 71-4). When the SOC of the secondary battery 6 is equal to or greater than the SOC lower limit (YES at STEP 71-4), the process returns to STEP 71-2 and the heater 86 is continued to be energized. On the other hand, when the SOC of the secondary battery 6 drops lower than the SOC lower limit (NO at STEP 71-4) irregularly, the power supply to the first power supply portion 10 is paused and the process returns to STEP 71-2 and the heater 86 is continued to be energized.

Herein, the case where the SOC of the secondary battery 6 becomes below the SOC lower limit set at STEP 43 may be, for example, a case where an oil heater which consumes electric power greatly is being used at the maximum electric power consuming state, a case where the electric power consumed at the first power supply portion 10 is extremely greater than the estimated normal electric power consumption value, or a case where the SOC of the secondary battery 6 is extremely small from the beginning.

When the fuel cell 1 is initiated (from STEP 72), the power supply controlling unit 30 charges the capacitor 2 and the secondary battery 6 by using the fuel cell 1; when the SOC thereof increases (YES at STEP 75), whether or not the power supply to the first power supply portion 10 is being paused is determined (STEP 75-2).

If the power supply to the first power supply portion 10 is determined to have been paused (YES at STEP 75-2), the power supply to the first power supply portion 10 is re-started (STEP 75-3) and the process after STEP 76 is performed.

If the power supply to the first power supply portion 10 is determined to have not been paused (NO at STEP 75-2), the process after STEP 76 will be continued under the situation.

To be specific, the initiation of the fuel cell 1 in a case when the measured temperatures of the fuel cell 1 and the coolant are −10° C. will be described with reference to FIG. 3.

The SOC of the secondary battery 6 decreases with time (t2<t), if the SOC is less than 37%, namely the predefined value, at time t3' (STEP 50-2), the process shifts to the initiation routine of the fuel cell 1.

The shift timing (t3') to the initiation routine of the fuel cell 1 at a low temperature (the freezing point) will be earlier than the shift timing (t3) at a normal temperature with a portion corresponding to the SOC lower limit set at STEP 43. In other words, since the value (5%, STEP 50-2) added to the SOC lower limit is also performed in the normal power supply routine (STEP 50), the difference of the shift timing to the initiation routine of the fuel cell 1 is resulted from the amount of power added to the discharge threshold of the secondary battery 6 at STEP 43.

Therefore, when the measured temperatures of the fuel cell 1 and the coolant are lower than −10° C., the value to be added to the discharge threshold at STEP 43 is greater, and consequently, the SOC lower limit becomes greater, the shift timing to the initiation routine of the fuel cell 1 is further earlier as the timing t3" as illustrated in FIG. 3.

Thereafter, the process shifts to the initiation routine of the fuel cell 1 (the freezing point FC initiation routine) at t3', the secondary battery 6 is initiated to energize the heater 86 (STEP 71-2). Then, when the coolant temperature becomes equal to or greater than 0° C., the coolant circulation pump 81 is actuated; when the fuel cell 1 becomes equal to or greater than 0° C. (YES at STEP 71-3), the reactant gas is supplied to the fuel cell 1 and the fuel cell 1 is initiated (STEP 72).

As illustrated in FIG. 3, during the interval from time t3' to a time when the fuel cell 1 is initiated until the output thereof is increased, while the secondary battery 6 is energizing the heater 86, the power supply from the secondary battery 6 to the first power supply portion 10 is being continued. Therefore, according to the power system of the present embodiment, since the fuel cell 1 is heated in consideration of the heating time by the heater 86 (the time needed to heat the fuel cell 1 and the coolant to 0° C.), the power can be supplied from the first power supply portion 10 to the outside steadily even at a low temperature (the freezing point).

Similar to the normal power supply routine, when the output from the fuel cell 1 reaches the rated output of the predefined value (for example, 80% of the maximum output) at time t4, the power supply controlling unit 30 supplies the first power supply portion 10 with the power from the fuel cell 1 and actuates the voltage boost unit 3 and the voltage converter 7 so as to supply the power to the capacitor 2 and the secondary battery 6 to charge them.

Hitherto, the freezing point power supply routine at STEP 4 is described in detail.

According to the power system of the above-mentioned configuration, the SOC of the capacitor 2 and the SOC of the secondary battery 6 are added to the output of the fuel cell 1 to enable the power supplied to the first power supply portion 10 with a commercial alternating voltage of AC 100V steadily even at a low temperature.

The power system of the present embodiment is described to have the capacitor 2 provided therein; however, it is not limited thereto, it is acceptable that the power system is not provided with the capacitor 2.

In the present embodiment, the power is supplied from the secondary battery 6 to the first power supply portion 10 by actuating both the voltage boost unit 3 and the voltage converter 7; however, it is not limited thereto, it is acceptable to control the power supply from the secondary battery 6 to the first power supply portion 10 by fixing (shortcut) either one of the voltage boost unit 3 and the voltage converter 7 and actuating the other one only.

In the present embodiment, the first power supply portion 10 is disposed between the capacitor 2 and the voltage boost unit 3; however, it is acceptable to dispose it between the voltage boost unit 3 and the PDU4 (SW3). In this case, the power can be supplied from the third power supply line L3 in high voltage to the first power supply portion 10, therefore, it is possible to supply stable power to an electric device (for example, a microwave oven or a dryer) which consumes large power, to charge another electric vehicle, or the like.

In the present embodiment, the second power supply portion 20 is supplied with small power from the secondary battery 6 by priority; however, it is not limited thereto, it is acceptable to supply power from the fuel cell 1 and the capacitor 2 via the voltage boost unit 3 and the voltage converter 7.

In the present embodiment, the first power supply line L1 is connected to the first power supply portion 10; it is also acceptable to connect the third power supply line L3 to the second power supply portion 20. According to this configuration, the second power supply portion 20 can supply power with a high voltage equal to or greater than the first power supply portion 10.

In the present embodiment, when the fuel cell 1 is generating power and the SOC of the capacitor 2 and the SOC of the secondary battery 6 are not increasing (STEP 75), the amount of power generated from the fuel cell 1 is increased (STEP 78); however, it is not limited thereto, it is acceptable to actuate either one or both of the voltage boost unit 3 and the voltage converter 7 when the SOC of the secondary battery 6 is not increasing. Thereby, it is possible to prevent the amount of power generated from the fuel cell 1 from becoming greater.

In the present embodiment, the amount of power needed to heat the coolant and the fuel cell 1 to 0° C. is calculated (STEP 42), however, it is not limited thereto, when there is not such a configuration corresponded to the coolant circulated in the circulation path for cooling the fuel cell 1, it is acceptable to heat the fuel cell 1 by the heater. In this case, the amount of power calculated according to line A in FIG. 9 is added to the discharge threshold of the secondary battery 6 and set as the SOC lower limit (corresponding to the first discharge threshold of the present invention) of the secondary battery 6 (STEP 43).

In the present embodiment, the amount of power needed to heat the coolant and the fuel cell 1 to at least 0° C. is calculated according to the measured temperatures thereof, and the SOC lower limit of the secondary battery 6 is set according to the calculated amount of power (STEP 43); however, it is not limited thereto, the SOC lower limit of the secondary battery 6 may be set or corrected according to a decreasing tendency of the SOC of the secondary battery 6 after the secondary battery 6 has started to supply the power to the first power supply portion 10 (in cases it may be the capacitor 2 to supply the power initially).

In the present embodiment, the fuel cell 1 is served as the power supply unit; however, it is acceptable to use a device other than the fuel cell 1 as the power supply unit. For example, an engine and a motor which is connected to an output shaft of the engine and functions as a generator may be used in place of the fuel cell 1. Thereby, the SOC lower limit of the secondary battery 6 may be set according to an amount of power needed to drive the engine (power needed by the warm-up operation) at a low temperature (STEP 43).

What is claimed is:

1. A power system disposed in a vehicle, comprising:
a power supply unit;
a first voltage boost unit configured to have one side connected to the power supply unit and the other side connected to an electric motor for driving the vehicle, and to boost an output voltage from the power supply unit and supply power with the boosted output voltage to the electric motor;
a second voltage boost unit configured to have one side connected to the other side of the first voltage boost unit in parallel with the electric motor, and to further boost the output voltage boosted by the first voltage boost unit;
an electric accumulator connected to the other side of the second voltage boost unit;
a first power supply portion which is connected to one side of the first voltage boost unit in parallel with the power supply unit and capable of supplying power to the outside;
a first temperature sensor configured to measure a temperature of the power supply unit; and
a power supply controlling unit configured to:
calculate an amount of power, wherein the calculated amount of power corresponds to a power needed to heat the power supply unit equal to or greater than a temperature threshold when the temperature of the power supply unit measured by the first temperature sensor drops lower than the temperature threshold,
set a first discharge threshold, wherein the first discharge threshold corresponds to an addition of the calculated amount of power to a discharge threshold of the electric accumulator, and
control the power supply from the power supply unit and the electric accumulator to the first power supply portion to be greater than the first discharge threshold.

2. The power system according to claim 1 is provided with
a fuel cell as the power supply unit; and
a second temperature sensor configured to measure a temperature of a coolant circulated in a circulation path disposed in the vehicle for cooling at least the fuel cell;
wherein the power supply controlling unit configured to calculate an amount of power needed to heat the coolant equal to or greater than a temperature threshold when the temperature of the coolant measured by the second temperature sensor drops lower than the temperature threshold, set a second discharge threshold by adding the calculated amount of power to the first discharge threshold, and control the power supply from the fuel cell and the electric accumulator to the first power supply portion to be greater than the second discharge threshold.

3. The power system according to claim 2, wherein the power supply controlling unit is configured to control the power supply from the electric accumulator to the first power supply portion before the fuel cell is initiated.

4. The power system according to claim 3 is provided with
a capacitor connected to one side of the first voltage boost unit in parallel with the fuel cell; and
a secondary battery as the electric accumulator;
wherein the power supply controlling unit is configured to control the power supply to the first power supply portion firstly from the capacitor, secondly from the secondary battery and thirdly from the fuel cell, initiate the power supply from the secondary battery to the first power supply portion in place of the capacitor when a capacity of charge of the capacitor is equal to a discharge threshold, actuate the fuel cell when a capacity of charge of the secondary battery is equal to a predefined value greater than the second discharge threshold, and initiate the power supply from the fuel cell to the first power supply portion in place of the secondary battery when a predefined output is available from the fuel cell.

5. The power system according to claim 4 is provided with a second power supply portion which is connected in parallel to the second voltage boost unit and the secondary battery and capable of supplying power to the outside.

6. The power system according to claim 4 is provided with a display unit configured to display an amount of power which can be supplied from the capacity of charge of the capacitor and the secondary battery.

* * * * *